(12) United States Patent
Varadarajan et al.

(10) Patent No.: US 9,665,868 B2
(45) Date of Patent: May 30, 2017

(54) ONE-TIME USE PASSWORD SYSTEMS AND METHODS

(75) Inventors: Rammohan Varadarajan, Cupertino, CA (US); Ambarish Malpani, Palo Alto, CA (US)

(73) Assignee: CA, Inc., New York, NY (US)

( * ) Notice: Subject to any disclaimer, the term of this patent is extended or adjusted under 35 U.S.C. 154(b) by 1178 days.

(21) Appl. No.: 13/103,797

(22) Filed: May 9, 2011

(65) Prior Publication Data

US 2011/0276495 A1 Nov. 10, 2011

Related U.S. Application Data

(60) Provisional application No. 61/333,186, filed on May 10, 2010.

(51) Int. Cl.
*G06Q 20/00* (2012.01)
*G06Q 20/38* (2012.01)
(Continued)

(52) U.S. Cl.
CPC ........... *G06Q 20/385* (2013.01); *G06F 21/31* (2013.01); *G06F 21/335* (2013.01);
(Continued)

(58) Field of Classification Search
USPC .......................................................... 705/71
See application file for complete search history.

(56) References Cited

U.S. PATENT DOCUMENTS 7,328,350 B2 2/2008 Hird
7,454,782 B2 11/2008 Rajasekaran et al.
(Continued)

OTHER PUBLICATIONS

European Office Action dated Sep. 23, 2016, European Application No. 11781162.0.
Response to European Office Action dated Jun. 25, 2013, European Application No. 11781162.0, filed May 10, 2011, 11 pages.

*Primary Examiner* — Charles C Agwumezie
(74) *Attorney, Agent, or Firm* — Vierra Magen Marcus LLP

(57) ABSTRACT

According to the invention, a method of using a one-time password for a transaction between a user and a merchant is disclosed. The method may include generating the one-time password. The method may also include authenticating the user by the authentication server in response to a request from the user to use the one-time password. The method may further include authorizing the use of the one-time password for the transaction in response to authenticating the user by the authentication server. The method may moreover include using the one-time password in combination with an account number to settle the transaction between the user and the merchant. The method may additionally include sending a message to the authentication server originating from the merchant, wherein the message comprises the one-time password, and wherein the message requests a determination whether the one-time password is authorized for use in the transaction. The method may also include sending a message to the merchant originating from the authentication server, wherein the message includes a determination whether the transaction should be approved in response to the authentication server determining whether the one-time password is authorized for use in the transaction.

22 Claims, 13 Drawing Sheets

(51) Int. Cl.
  *G06F 21/31* (2013.01)
  *G06F 21/33* (2013.01)
  *G06Q 20/40* (2012.01)
  *H04L 9/32* (2006.01)
  *H04L 29/06* (2006.01)

(52) U.S. Cl.
  CPC ....... *G06Q 20/382* (2013.01); *G06Q 20/3829* (2013.01); *G06Q 20/40* (2013.01); *G06Q 20/4014* (2013.01); *H04L 9/321* (2013.01); *H04L 9/3228* (2013.01); *H04L 9/3271* (2013.01); *H04L 63/0838* (2013.01); *G06F 2221/2103* (2013.01); *H04L 2209/56* (2013.01); *H04L 2463/062* (2013.01)

(56) References Cited

U.S. PATENT DOCUMENTS

| | | | |
|---|---|---|---|
| 2003/0204725 A1* | 10/2003 | Itoi | G06Q 20/04 |
| | | | 713/168 |
| 2006/0037066 A1 | 2/2006 | Audebert | |
| 2007/0033642 A1 | 2/2007 | Ganesan et al. | |
| 2008/0110983 A1 | 5/2008 | Ashfield | |
| 2009/0094230 A1* | 4/2009 | Sakata | H04N 7/17318 |
| 2009/0104888 A1* | 4/2009 | Cox | G06F 21/31 |
| | | | 455/410 |
| 2009/0259588 A1 | 10/2009 | Lindsay | |
| 2009/0328168 A1* | 12/2009 | Lee | G06F 21/34 |
| | | | 726/6 |
| 2010/0114776 A1 | 5/2010 | Weller et al. | |

* cited by examiner

ONE-TIME USE PASSWORD SYSTEMS AND METHODS

CROSS-REFERENCES TO RELATED APPLICATIONS

This application claims benefit under 35 U.S.C. 119(e) of U.S. Provisional Patent Application No. 61/333,186, filed on May 10, 2010, which is herein incorporated by reference in its entirety for all purpose.

FIELD OF THE INVENTION

The present invention relates generally to transaction processing, and more particularly to the use of one-time passwords and authentication.

BACKGROUND OF THE INVENTION

There are many systems that rely on static PIN's to authenticate a user. Some examples of such systems include debit card payments, ATM transactions, and/or cash withdrawal with credit cards. PIN based systems are often not used for internet, or card not present (CNP) types of transactions, because these types of transactions are particularly vulnerable to intercept, compromise, and/or future fraudulent activity. For example, if an unauthorized user acquires a card number and the corresponding PIN, the unauthorized user can impersonate the card owner in future transactions.

The trust model upon which PIN-based systems are based is further made vulnerable because most merchants that accept PINs trust the PIN verification completely, either by choice or by requirement. Compromise of any a single PIN accepting device, such as automatic teller machines (ATM's) or point of sale (POS) readers may result in potential fraud against the system. Although some advances have been made to PIN-based systems, these systems continue to fall short.

One example is RSA's SecurID system, which provides a one-time password (OTP) scheme that employs a hardware device that generates an OTP as a function of the current time.

Another such example identifies three parties: the user, the authorization server, and the service provider. When the user wants to access some service provided by the service provider (s)he is given a OTP. The user submits the password to the service provider and subsequently the service provider forwards the password to the authentication server. If the one time password is correct for the user, the authentication server sends an authentication service ID for the user to the service provider. This signals a successful authentication.

Yet another such example pertains to a system for securing access to resources by means of a password that automatically changes after every use.

A final example describes a OTP scheme that employs cues and passwords. A user will pick a sequence of ordered cues and the corresponding passwords during registration. A cue could be a word, an image, a picture, etc. Whenever the user wants to access a resource of interest, (s)he has to authenticate herself/himself to the authentication manager (AM). The AM will start by presenting the next cue. After seeing this cue, the user is must input the corresponding password. If the user inputs the correct password, the AM will authenticate the user, and will present the next cue from the list of ordered cues during the next request.

In each of these systems, even those in which the PIN is not static, the user can be impersonated. Once an unauthorized user gains access to a device of an authorized user, the unauthorized user will be able to access future PIN's. A methodical brute force dictionary attack on a user's PIN is also possible, so long as the attacker is patient and tries the various PIN numbers over a long interval of time.

Embodiments of the current invention provide solutions to these and other problems.

BRIEF SUMMARY OF THE INVENTION

In one embodiment, a method of using a one-time password for a transaction between a user and a merchant is provided. The method may include generating the one-time password. The method may also include authenticating the user by the authentication server in response to a request from the user to use the one-time password. The method may further include authorizing the use of the one-time password for the transaction in response to authenticating the user by the authentication server. The method may moreover include using the one-time password in combination with an account number to settle the transaction between the user and the merchant. The method may additionally include sending a message to the authentication server originating from the merchant, wherein the message comprises the one-time password, and wherein the message requests a determination whether the one-time password is authorized for use in the transaction. The method may also include sending a message to the merchant originating from the authentication server, wherein the message includes a determination whether the transaction should be approved in response to the authentication server determining whether the one-time password is authorized for use in the transaction.

In another embodiment, a method of using a one-time password for a transaction by a user is provided. The method may include requesting authorization from an authentication server to use the one-time password in the transaction. The method may also include signing a challenge to create a signed challenge. The method may further include sending the signed challenge to the authentication server to authenticate the user and authorize the use of the one-time password in the transaction.

In another embodiment, a method of processing a password and an account number by an issuer server, the password and account number being used in a transaction is provided. The method may include receiving the password and the account number from a device of a merchant as part of the transaction. The method also may include in response to receiving the password and the account number, associating the account number with an account of a customer of the issuer server. The method may further include determining whether the password is a one-time password. The method may moreover include in response to a determination that the password is a one-time password, sending the password to an authentication server to verify that the password is authorized for the transaction. The method may additionally include receiving a determination from the authentication server as to whether the password is authorized for use in the transaction by an authenticated user. The method may also include in response to the determination from the authentication server as to whether the password is authorized, sending the device of the merchant a determination as to whether the transaction should be approved.

In another embodiment, a method of authorizing a one-time password by an authentication server to be used in a transaction by a user is provided. The method may include receiving a request originating from a device of the user to authorize the one-time password. The method may also include sending a challenge via a secure communication channel to the device of the user to authenticate the user. The method may further include receiving a signed challenge originating from the device of the user via a secure communication channel. The method may moreover include determining whether the user is authentic. The method may additionally include authorizing the one-time password for use in the transaction in response to a determination that the user is authentic.

In another embodiment, a system for using a one-time password in a transaction is provided. The system may include a device of a user. The system may also include a device of a merchant configured to receive the one-time password and an account number from the device of the user. The system may further include an authentication server configured to receive a request originating from the device of the user to authorize the one-time password for use in the transaction. The system may moreover include an issuer server configured to communicate with the device of the merchant to determine whether the one-time password is authorized for use in the transaction, and configured to communicate with the authentication server to determine whether the one-time password is authorized for use in the transaction. The authentication server may be configured to communicate with the issuer server to determine whether the one-time password is authorized for use in the transaction.

In another embodiment, a computer program product for an issuer server including a processor is provided. The product may include code that directs the processor to receive a message originating from a device of a merchant, the message comprising a password and an account number. The product may also include code that directs the processor to associate the account number with an account of a customer of the issuer server. The product may further include code that directs the processor to determine whether the password is a one-time password. The product may moreover include code that directs the processor to send a message comprising the password to an authentication server to determine whether the password is authorized as a one-time password for the transaction. The product may additionally include code that directs the processor to receive a message from the authentication server indicating whether the one-time password is authorized by an authenticated user. The product may also include code that directs the processor to send a message to the merchant including a determination whether the transaction is approved.

DETAILED DESCRIPTION OF THE INVENTION

Figure 1:
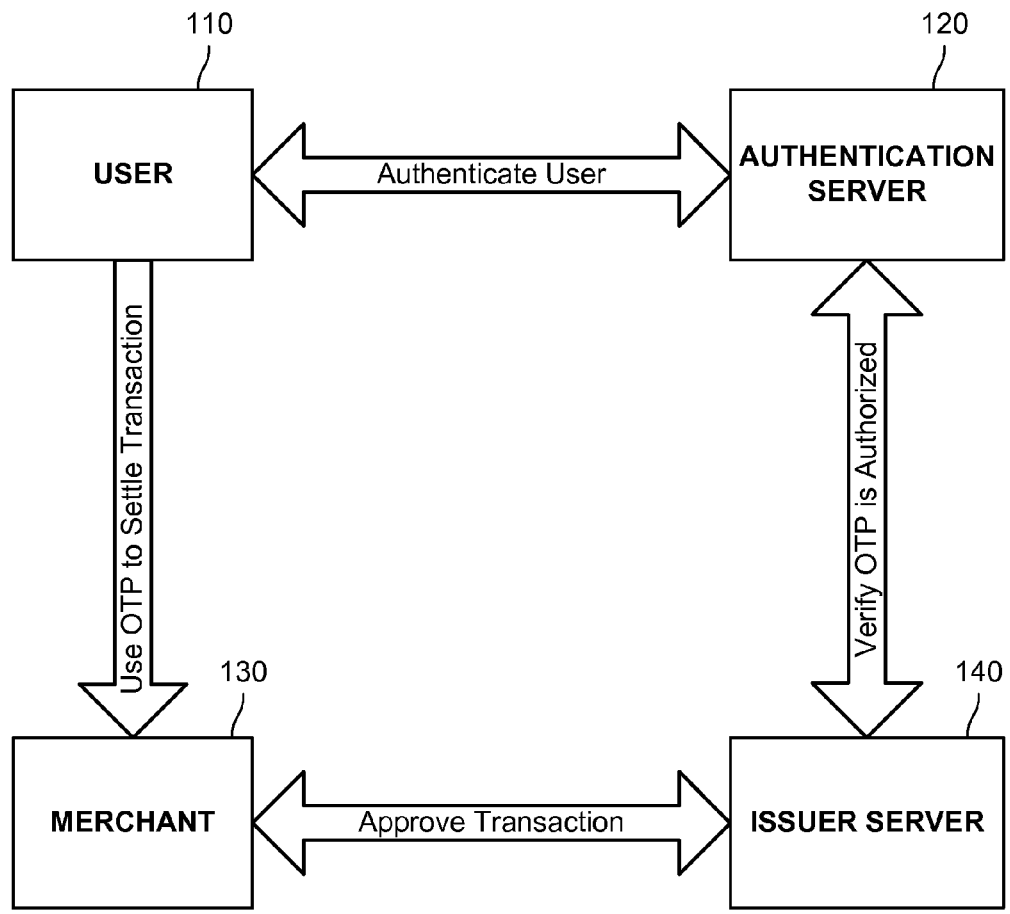
FIG. 1 is an overview of the system for OTP authentication and use in a transaction.

A novel one-time password (OTP) scheme between a user and a merchant is described below. A transaction will usually begin with a user approaching a merchant to initiate a transaction. Those skilled in the art will readily understand that the terms "user" and "merchant" are representative of the entities on either side of the transaction and should not be limited to individuals. For example, a user could be an individual using a credit or debit card, a corporate entity, a bank or other financial institution, a government agency, or any other entity that could benefit from using an OTP with an associated account number to enhance the security of a transaction. The merchant in this description could be a retailer, a bank or other financial institution, an ATM, a government agency, an individual, or numerous other entities that could participate in similar transactions.

The transactions described herein are likewise representative of a broad class of transactions that would be readily identified by one with skill in the art. Merely by way of example, the transaction in one embodiment may be a retail purchase between an individual and a retailer, the individual paying by means of a credit card, debit card, check, money order, or other form of electronic transfer. In other embodiments, the transaction might be between a bank and a customer, either in person at a teller window, impersonally via a drive-up window or ATM, remotely over a telephone or internet connection, or automatically using scheduled transfers. In another embodiment, the user may be initiating a transaction through the merchant's website using a secure internet connection to settle the transaction. In other embodiments, the user and the merchant could be parties to an automatic transfer set up in advance or in real-time by an automated system associated with a bank or government agency.

In some cases, the user and the merchant may use electronic devices to complete the steps of the methods described. By way of example, a user device might include a PDA, a smart phone such as the iPhone or BlackBerry, a laptop computer, a desktop computers, a server, a digital music player, an electronic device supplied by the merchant at the point of sale, a webpage or ASP, a dedicated device for carrying out the steps of the invention, a hardware token or card that is synchronized with other hardware devices and that may allow for user input, and/or a pin pad with a wired or wireless communication port. The merchant device could take the form of many of these same devices and may also include by way of example, devices such as an ATM, a pin pad and magnetic strip reader, a cash register a custom electronic device for handling secure transactions, a receiver or transmitter using near-field technology (NFC), a touch screen, an automated web-based interface, a website, a check processing machine, a document scanner, a voice recognition device, and/or a POS device. These examples are illustrative of the types of technology that can be used by the user and the merchant, and they are not meant to limit the devices could be used. Technological advances in devices such as PDA's, smart phones, smart cards, and microchip-enabled credit, debit, and identification cards could also be used in the future to complete the transactions of this invention.

The OTP may also take different forms and have different meanings depending upon the type of transaction, the type of account associated with the OTP, and the particular demands of both the user and the merchant. Merely by way of example, in some embodiments the OTP may take the form of a PIN, such as in debit card and ATM transactions. In other embodiments, the OTP may take the form of a card security code (CCV), such as in credit card and internet-based transactions. In other embodiments, the OTP may take the form of a code that is specific to some variable associated with the transaction, such as the user, the merchant, the time, the location, or the amount of money associated with the transaction. The OTP may take various forms and serve various functions depending upon the needs of the parties involved in the transaction.

The various embodiments of the invention may use means of electronic communication to send data between the user, the merchant and various servers to carry out the steps of the methods described. As one with skill in the art would readily recognize, the communication between the various entities and devices may involve many communication intermediaries. For example, these could include email servers, internet service providers, corporate servers, banking systems, mass storage devices, credit card payment networks, or even individuals. Merely by way of example, a request, a message, or a notification sent from a merchant to an issuer server could pass through any number of intermediaries, including but not limited to, a private corporate network, communication routers, a merchant bank, an acquirer server or network, or credit card payment networks. These communication networks may change over time as technology progresses without, for example, affecting the fact that a message can originate from a merchant and arrive at an issuer server.

While this description illustrates the use of an OTP in monetary transactions, it would be clear to one having skill in the art that these systems and methods could be used in other transactions in which the transaction requires secure authentication of the identity of a party to the transaction for an exchange using an OTP. The descriptions herein are exemplary and used to illustrate various embodiments of the invention, but are not meant to limit the invention to these embodiments.

Turning now to FIG. 1, which shows an overview 100 of some of the components of one embodiment. A transaction may begin with a user 110 initiating the transaction with a merchant 130. Data may be passed back and forth between merchant 130 and user 110 by, for example, oral or electronic means of communication. As the transaction proceeds, the user may make a request to an authentication server 120 to authorize the use of an OTP in the transaction. Data may be exchanged between user 110 and authentication server 120 such that the identity of user 110 is authenticated using any method satisfactory to authentication server 120. After authentication, the OTP is authorized for use in the transaction.

To settle the transaction between user 110 and merchant 130, user 110 may pass the OTP and an account number to merchant 130. At this point, merchant 130 may originate an electronic communication that will eventually reach authentication server 120. In this embodiment, the electronic communication will first arrive at an issuer 140 in order to approve the transaction. Issuer 140 may communicate with authentication server 120 to determine whether a transaction using the OTP should be approved. Once issuer 140 receives this determination from the authentication server 120, issuer 140 may approve or deny the transaction, and may communicate this decision to merchant 130.

In one embodiment, user 110 is a customer of a bank associated with issuer 140. The transaction may be characterized by the customer initiating a financial transaction with the bank. Merchant 130 in the transaction may be an ATM or live teller window at the bank that interacts with the customer. User 110 could interact with authentication server 120 to authenticate his or her identity and authorize the use of an OTP in the financial transaction. An account number and OTP could then be supplied to merchant 130 teller or ATM by the customer, user 110, and issuer 140 of the bank could determine whether the transaction should be approved or denied based in part on a determination made by authentication server 120 regarding the authentication of the user's identity.

In another embodiment, user 110 is participating in a transaction with merchant 130 online using a web browser. After authentication server 120 authenticates the identity of user 110 and authorizes the use of the OTP, the user could enter an account number and the OTP into the browser window to settle the transaction. The merchant 130 side of the transaction could then send the data to issuer 140 for approval based on a determination made by authentication server 120 as to whether the OTP should be authorized for use in the transaction.

Figure 2:
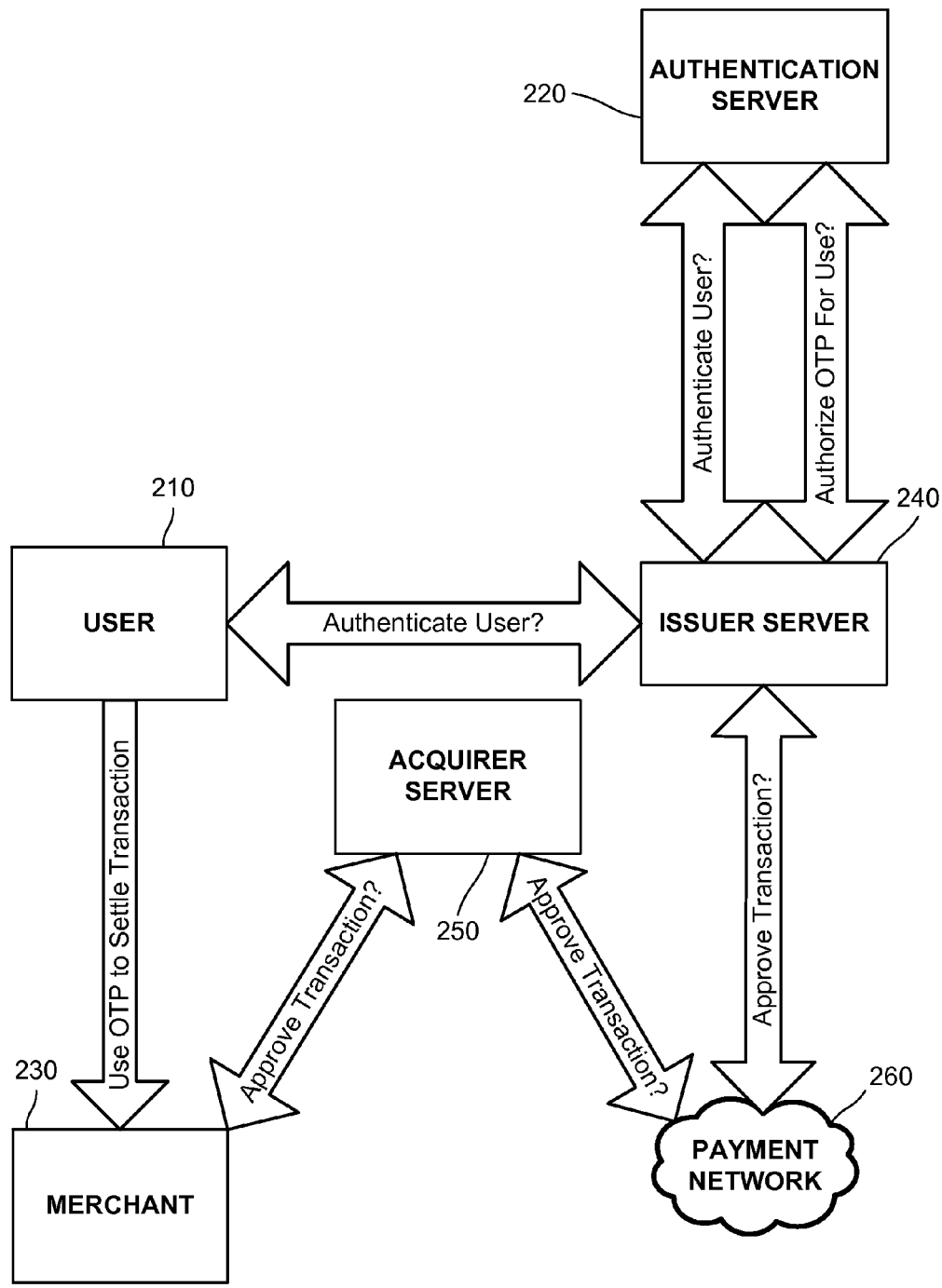
FIG. 2 is a first embodiment of the system using common credit card payment intermediaries.

FIG. 2 illustrates an example embodiment that includes some intermediaries that are commonly known to those skilled in the art. A user 210 may communicate with an authentication server 220 through an issuer server 240. The communication may be transparent, such that user 210 is unaware that the communication is being routed through more than one entity. Or the intermediary may be explicit, such that user 210 is aware that the communication passes through, for instance, an issuer server associated with the user's bank, which then contacts authentication server 220 to authorize use of the OTP.

Similarly, FIG. 2 shows an embodiment wherein the communication originating from merchant 230 passes through intermediaries before eventually arriving at issuer 240 and authentication server 220. Merchant 230 may send the transaction data to an acquirer 250, and the acquirer then may pass the transaction data on through a payment network 260.

In the embodiment of FIG. 2, a transaction that takes place using a website may hide any underlying details of the communication intermediaries. For instance, the website of the merchant can redirect the user to acquirer 250 or payment network 260 along with the transaction details. The site associated with acquirer server 250 may then prompt user 210 for the OTP. The user might not enter any information on the acquirer server's 250 website, but the data flow from the browser of user 210 flows directly through the merchant to acquirer 250, and arrive eventually at issuer 240.

FIGS. 3A-D illustrate in more detail various means by which different embodiments can generate the OTP. For example, the OTP could be generated at random, or as a function of some aspect of the user identity or the transaction. If an aspect of the transaction is used, the OTP could be generated as a function of a combination of the time, a user identification code, a hardware signature of the user device, the identity of the merchant, or a hardware signature of the merchant device. Transaction data can be generated by the merchant and passed to the user by various means. Alternatively, the user could generated the transaction data, such as price, date, time, register number, number of items, item types and brands, and item names. The user could then pass the transaction data to the merchant by various means. Means for passing transaction data could include aural, visible, electronic, or wireless methods of transmission. While the transaction specific data may be generated by the merchant and passed to the user, or the user may generate the data and pass the data to the merchant, the user and the merchant may also generate the data independently using a method that will produce similar results. If the OTP generation does not depend upon transaction-specific data, the OTP could be generated at a time prior to the transaction. For instance, at the time of the transaction the OTP could be chosen from a preexisting list of numbers, or output from a random number generator using a predefined seed.

Figure 3A:
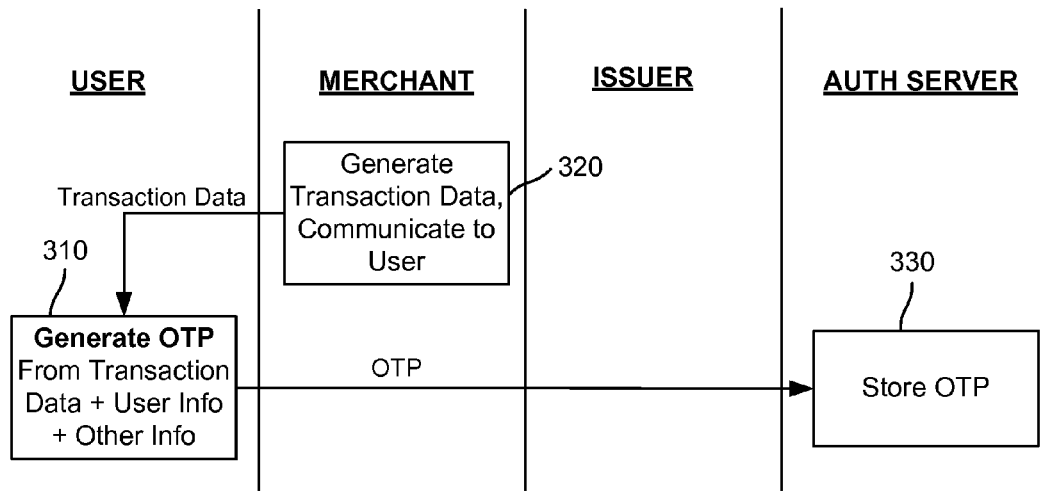
FIGS. 3A-D illustrate how various embodiments determine an OTP for a transaction.

FIG. 3A illustrates one example embodiment in which a device of the user generates the OTP. Here, the OTP is generated 310 using a combination of transaction data, user information, and other information that may be present at the time. The transaction data is entered by the user into a device of the user after being generated by the merchant, or it is transmitted to a device of the user from a device of the merchant 320. Alternatively, the data could be entered by the user without the aid of the merchant (not shown). The device of the user may use the various data inputs to generate an OTP using any of the various hash, concatenation, or number generation methods that are well known in the art. The user then may transmit the OTP from the device of the user to the authentication server 330, where the authentication will receive the OTP and may proceed to attempt to authenticate the identity of the user.

Figure 3B:
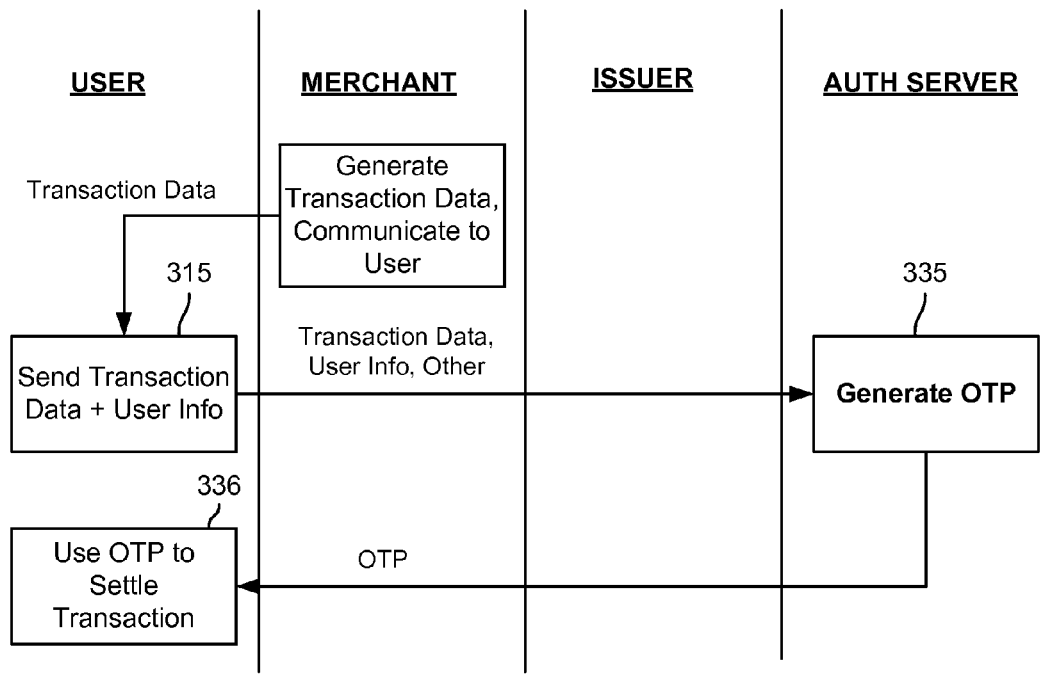

FIG. 3B illustrates another embodiment wherein the authentication server generates the OTP. Again, the OTP may be generated using transaction data that originate from the user or the merchant. The data may then be passed 315 from the user to the authentication server. After receiving the transaction data, the authentication server may use the transaction data to generate 335 the OTP, after which the OTP may be transmitted back 336 to the user before, after, or during the authentication of the user identity.

Figure 3C:
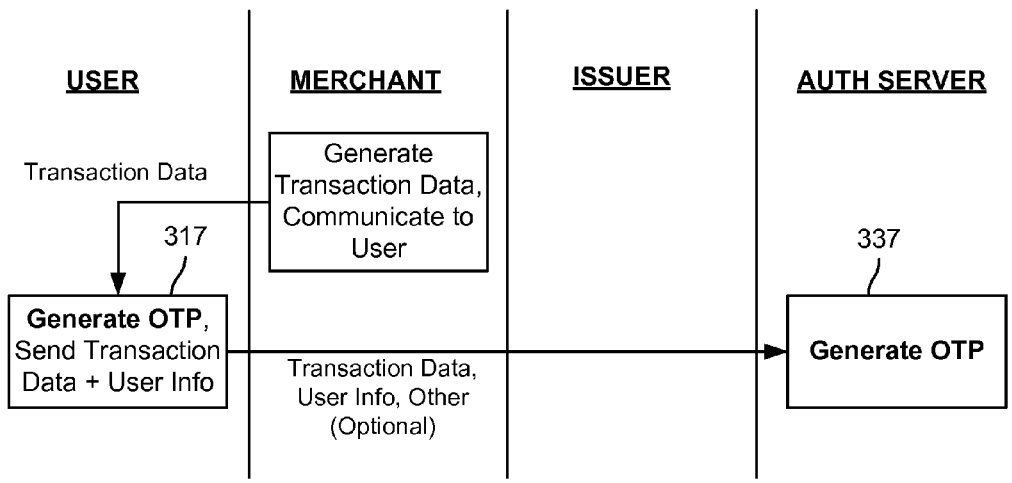

FIG. 3C illustrates an embodiment wherein the user and the authentication server may generate the OTP using the same inputs for whatever method is used to generate the OTP. In this case, the user may generate 317 the OTP, possibly using a portion of the transaction data, and may send at least a part of the data used to generate the OTP to the authentication server. After receiving the data, the authentication server may generate 337 the OTP using method substantially similar to the method used by the user or device of the user. The authentication server could generate 337 the OTP at any time up until the authentication server is contacted by a third party, such as the issuer server, requesting a determination as to whether the OTP is valid for use in the transaction. For example, the OTP could be generated after the user is authenticated. It is also possible for the user and the authentication server to generate the OTP without transmitting data at the time of the transaction. For example, both entities could chose the same number from a predefined list of passwords to be used in transactions of a particular type.

Figure 3D:
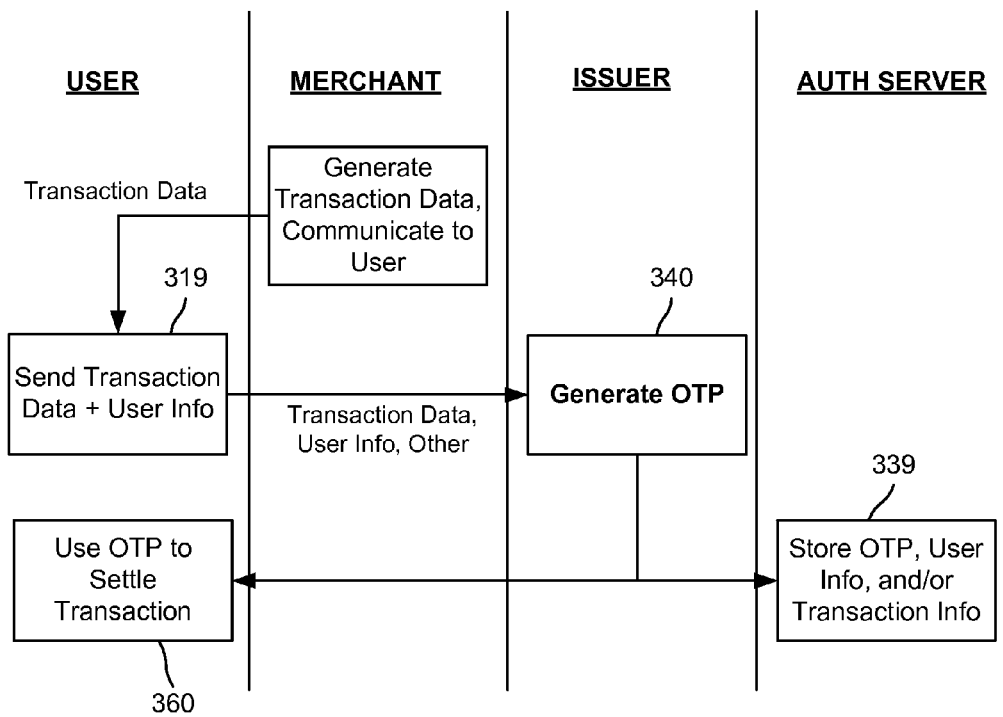

FIG. 3D illustrates another embodiment wherein the issuer server may generate 340 the OTP. The issuer server may or may not use data sent from the user to generate 340 the OTP. The issuer server may send the OTP to at least the user to use in settling the transaction 360. The issuer server can send the OTP to the authentication server 339 as part of the authentication of the user, or the issuer server can send the OTP to the authentication server as a later part of the transaction (not shown).

The forgoing methods for generating the OTP are exemplary and used to illustrate various embodiments of the invention, but are not meant to limit the invention to these embodiments.

Figure 4A:
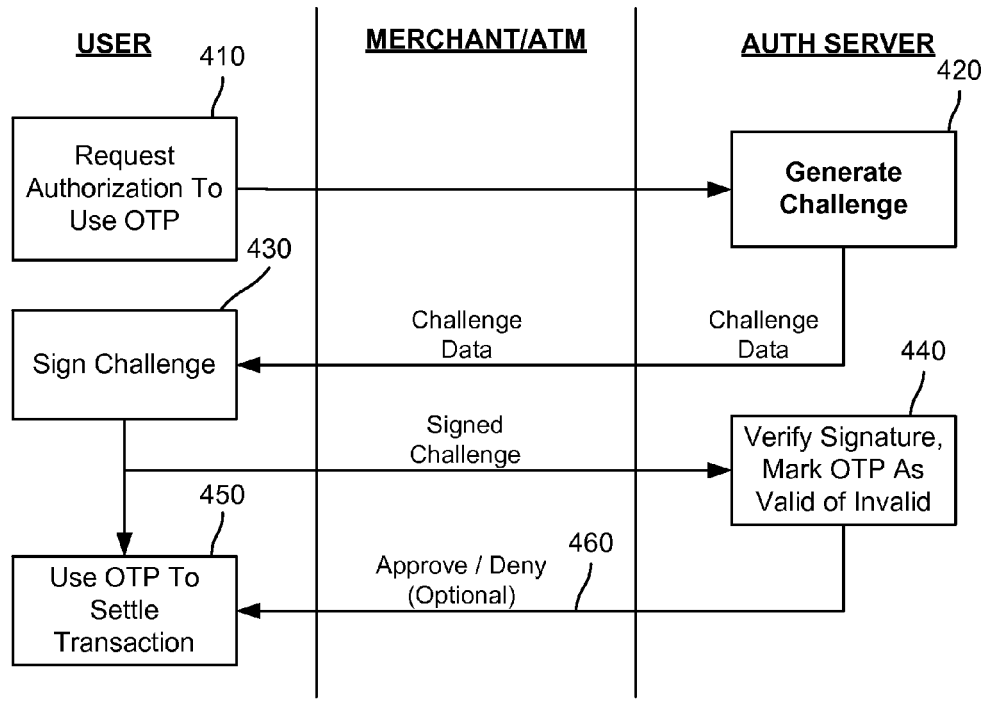
FIGS. 4A-B illustrate how various embodiments determine the challenge used for authentication in an OTP transaction.

In order for the authorization server to authorize the use of the OTP in the transaction, the authentication server must authenticate the identity of the user. FIG. 4A illustrates one example embodiment wherein the authentication server decrypts a challenge signed by the user to authenticate the identity of the user. First, the user may send a request to the authentication server 410 to authenticate the user's identity. This request may or may not be routed through an issuer or similar entity. Next, the authentication server generates a data string, or a "challenge," for the user to sign 420. The challenge may be comprised of specific data, or it may be random data. In some embodiments, the challenge may be comprised of at least a portion of the OTP itself. This challenge may be sent to the user to sign 430 using a key that is not generally known, but is known to the user. After the challenge is signed, the user may send the signed challenge to the authentication server, where the authentication server may determine whether the challenge has been signed by the user 440. The authentication server may keep a record of whether the OTP should be approved for use in the transaction. Optionally, the authentication server may send a notice to the user as to whether the authentication process determined that the user was valid 460. Around the time the user sends the signed challenge, the user may use the OTP to settle the transaction with the merchant 450.

Figure 4B:
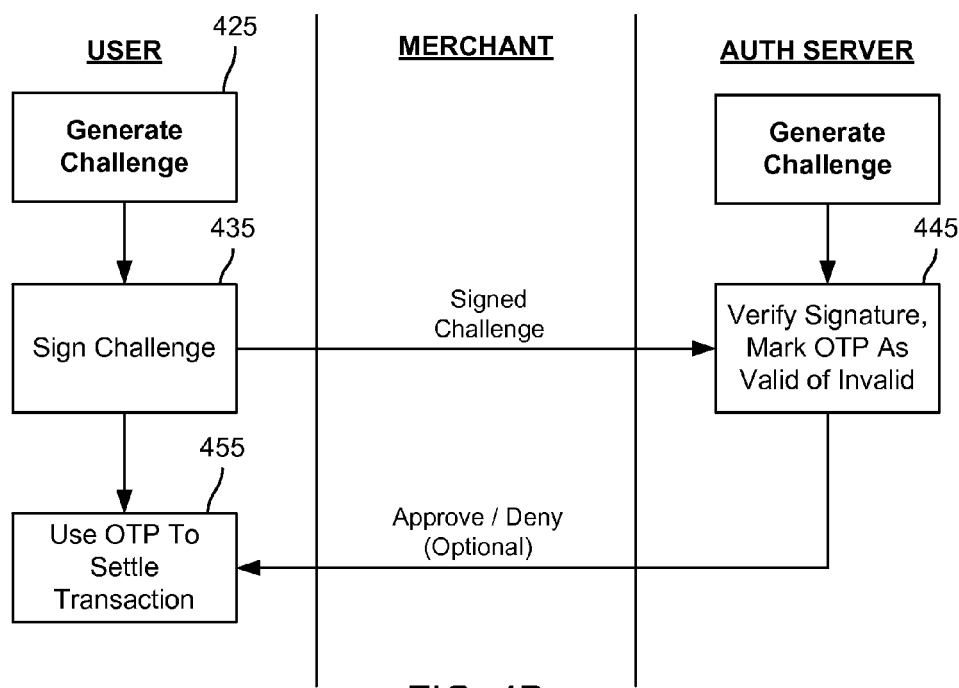

FIG. 4B shows another embodiment wherein the challenge is not necessarily passed between the user and the authentication server in an unsigned form. The challenge may be generated by the user 425 and then signed and sent to the authentication server 435. Instead of passing a request from the user to the authentication server to initiate the authentication process, the user may send the signed challenge to begin the authentication process. In order to validate the signature 445, the authentication server may use a challenge that is substantially the same as the challenge that was signed by the user. The authentication-side challenge may be generated using substantially the same method and inputs, or it may be predefined and agreed to by the user and the authentication server before the transaction. Generating the challenge can use similar methods as are used to generate the OTP, as described supra. Around the time the user sends the signed challenge, the user may use the OTP to settle the transaction with the merchant 455.

Figure 5:
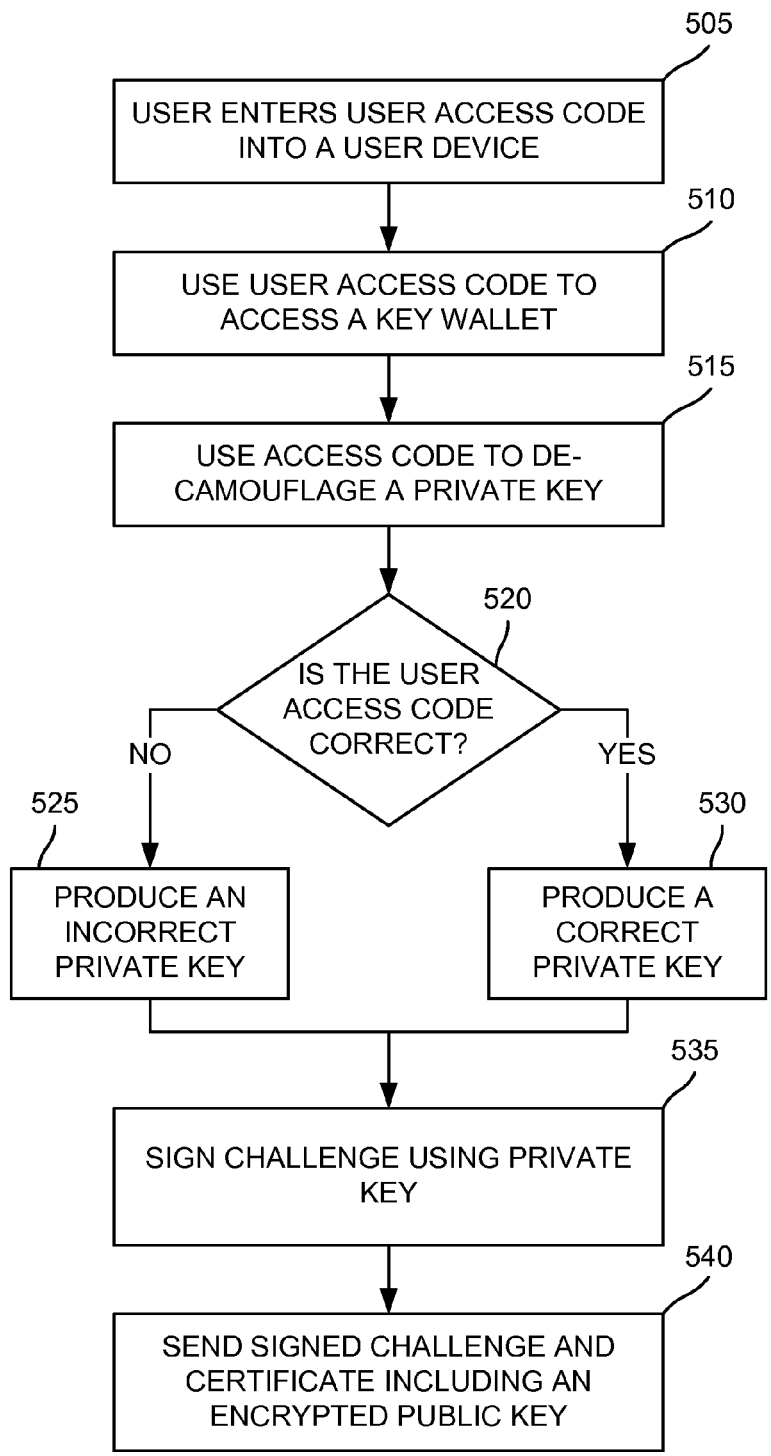
FIG. 5 illustrates a method used in some embodiments to sign a challenge.

The user may sign the challenge in a number of different ways. By way of example, the challenge could be signed using a symmetric private key that is not generally known, but that is known to both the user and the authentication server. Alternatively, the challenge could be signed by the user using a private key that is not generally known, that is associated with a public key that is known to the authentication server. FIG. 5 shows the method of signing the challenge used by the preferred embodiment. First, the user may enter an access code into a user device 505. The access code may be a sequence of data that is easy for the user to remember. The user device may contain a key wallet in hardware or software that is configured to accept the access code 510 and output a private key that can be used to sign the challenge 515. An example of a preferred key retrieval method is known as camouflaging. This type of key wallet may use the user access code as at least a partial seed to generate the output key. If the user access code is correct, the user's private key is generated. However, if the user access code is not correct, an incorrect key is generated. In some embodiments, an incorrect key may be of the same format as the correct key, and may be indistinguishable to an unauthorized user. Thus, even though it will be apparent to the authentication server, the user may not know whether the user access code that was entered is correct, which may prevent many brute force attacks on the key wallet. Such key wallet embodiments include Arcot Systems brand "Cryptographic Camouflage" key protection system as described in the U.S. Pat. No. 7,454,782, titled Method and System for Camouflaging Access-Controlled Data, filed Oct. 30, 2001, and assigned to the same assignee. This patent is incorporated by reference. If the user access code is correct 520, the key wallet may output the correct private key 530. If the user access code is not correct, the key wallet may output an incorrect private key 525 that may have the appearance of the correct private key. The private key may then be used to sign the challenge data 535, and the signed challenge may be sent to the authentication server 540 for authentication.

In some embodiments, the user sends a form of public or quasi-public identification 540 to the authentication server along with the signed challenge. This may be in the form of a standard digital certificate containing a public key that is associated with the private key used to sign the challenge. The X.509v3 digital certificate format standard is one example of a type of format that may be used as the digital certificate. The user may also send a reference to a public key stored and made available by a trusted third party, such as a Certificate Authority. In the preferred embodiment, the user sends a digital certificate containing a quasi-public key that is encrypted using a key that is not widely known, but that is known to the authentication server. The public key is stored on the user device in encrypted form and is sent to the authentication server with the signed challenge. One such product is the Arcot Systems brand "ArcotID" secure software credential as described in U.S. Pat. No. 7,328,350, titled Method and Apparatus for Secure Cryptographic Key Generation, Certification and Use, filed Jun. 5, 2001, and assigned to the same assignee. This patent is incorporated by reference.

Figure 6:
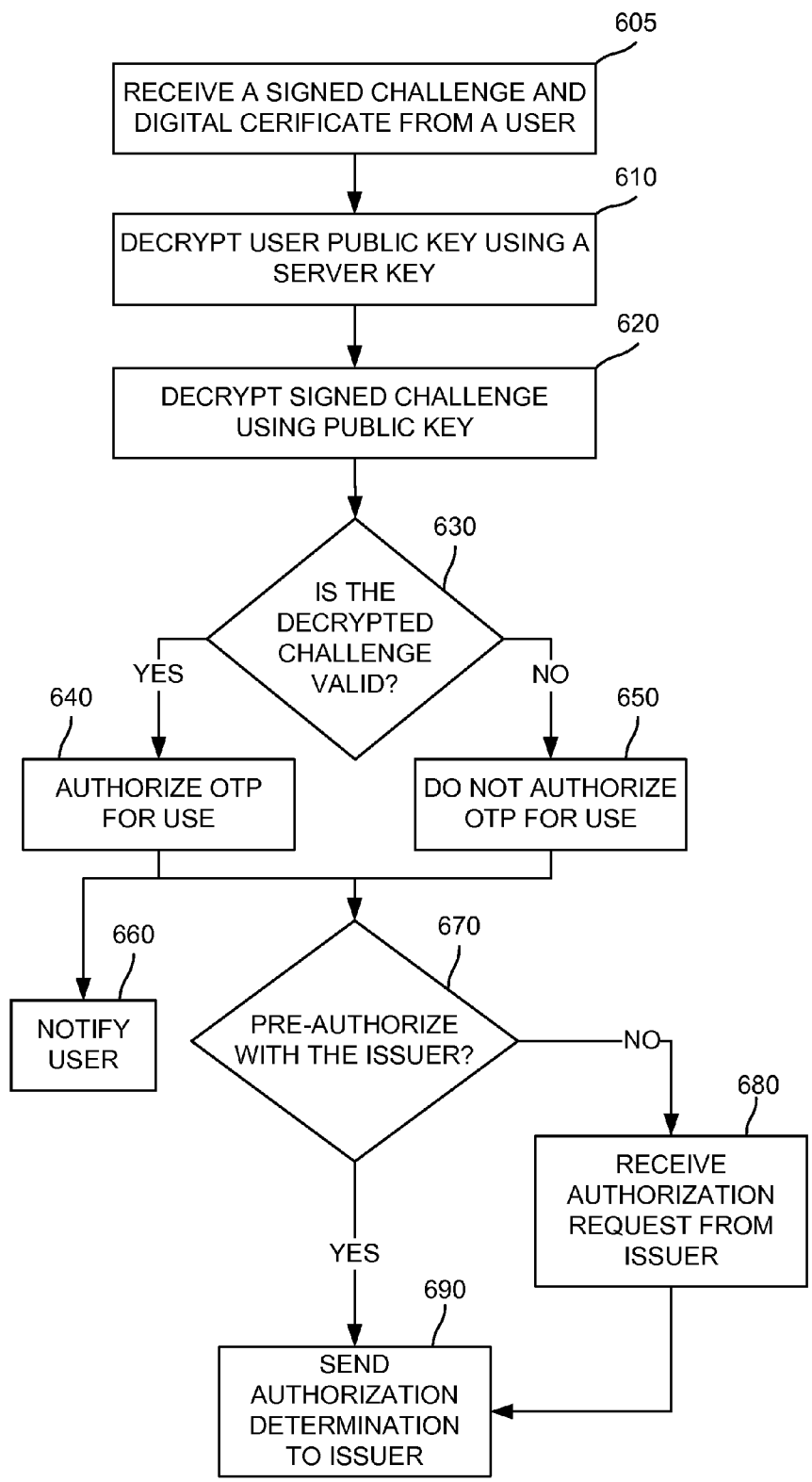
FIG. 6 illustrates a method used in some embodiments to authenticate a signed challenge.

When the authentication server receives the signed challenge from the user, the authentication server may proceed to determine whether the challenge was signed by the purported user in order to very the user's identity. In one embodiment, the signed challenge is decrypted using a symmetric key that may be the same as the key used to sign the challenge. In another embodiment, the signed challenge is decrypted using an asymmetric key associated with the key that was used to sign the challenge. In yet another embodiment, the key pairs used to encrypt and decrypt the challenge are a public key and private key pair. FIG. 6 illustrates a preferred embodiment in which a quasi-public key may be transmitted with the signed challenge, and the public key is encrypted using a secret server key that is not widely known, but that is known to the authentication server. After receiving a signed challenge message from a user 605, the authentication server may use the secret server key to decrypt the certificate containing the public key sent from the user 610. This public key may be used to identify the user to the authentication server and may be associated with the user private key that was used to sign the challenge. The authentication server uses the public key to decrypt the signed challenge 620.

To determine if the user is authentic, the authentication server may compare the decrypted challenge to an expected challenge 630. The expected challenge may be required to match the decrypted challenge exactly if the challenge was generated by the authentication server and sent to the user for signing. If the expected challenge was generated by the authentication server and the challenge that was signed was generated by the user or an issuer server, then the decrypted challenge and the expected challenge may only require a partial match, or a match within a certain margin of error, particularly if the time of the transaction or user other unique identifiers are used to generate the challenge in different places. If the authorization server determines that the decrypted challenge matches the expected challenge, the user may be authenticated, and the OTP may be authorized for use in the transaction 640. In some embodiments, no action will be taken in response to a failed authentication other than failing to authorize the OTP for use. In other embodiments, a failed authentication may result in logging the OTP and user identification as a fraudulent user, restricting further access to the user's account on the authentication server, and specifically designating the OTP as not authorized for the transaction 650. In some embodiments, the authentication server may send a reply message to the user indicating whether the authentication was successful and indicating whether the OTP has been authorized for use in the transaction 660.

In one embodiment, the authentication server may decide whether to inform an issuer associated with the account whether the OTP has been authorized by an authenticated user 670 prior to a request for such a determination from the issuer. A determination can be sent to the issuer indicating whether the OTP is authorized 690, or the authentication server can wait for a request from the issuer 680 to send a determination to the issuer.

Figures 7A, 7B:
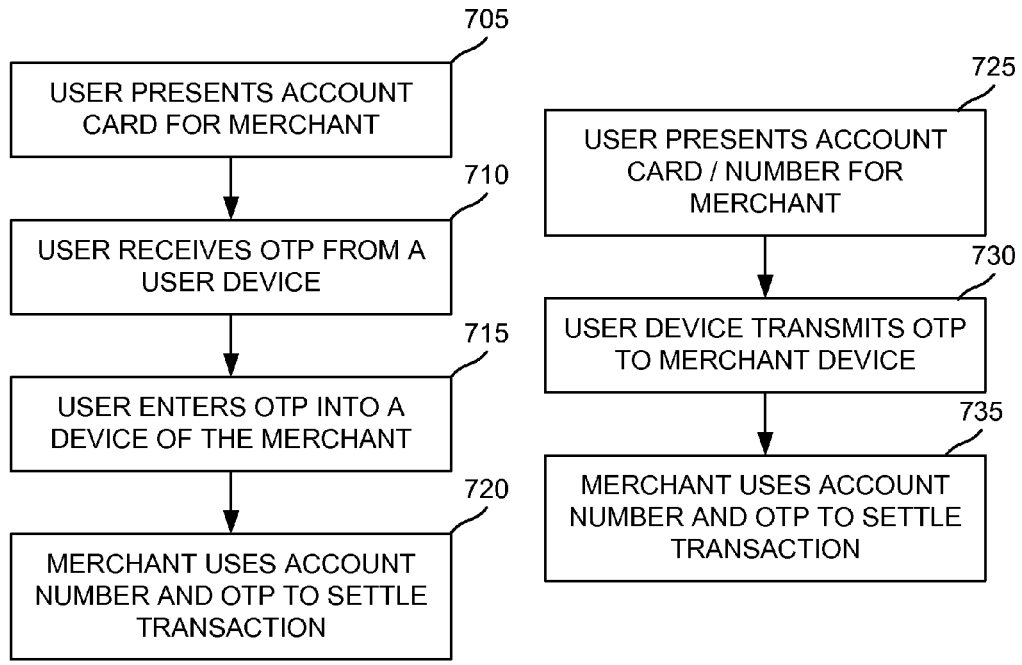
FIGS. 7A-C illustrate methods used by various embodiments to send an OTP and account number to a merchant.

Before or preferably after the authentication process, the user may use the OTP and the account number with which the OTP is associated to settle the transaction with the merchant. FIG. 7A illustrates one embodiment wherein the user presents the account number for the merchant to read 705. In some embodiments, a card containing a representation of the account number may be presented by the user. The account number may be stored in a magnetic strip, in physically raised numbers on the card, or within an electronic chip embedded in the card. The merchant can receive the account number using, for example, a magnetic strip reader, a carbon paper transfer device, or near field (NFC-enabled) technology to wireless read the account number from the user's card or other means of representation. These methods of reading an account number from a user representation such as a card are merely exemplary, and one having skill in the art would recognize many other ways for the user to communicate the account number to the merchant.

The user may also receive the OTP from the user device 710. In some example embodiments, the user device may display the OTP in readable format if the device is equipped with a screen, or it may broadcast a verbal representation of the OTP such that it can be audibly understood by the user. After receiving the OTP from the user device, the user may pass the OTP to the merchant 715. For example, the user could enter the OTP into a pin pad device supplied by the merchant, or the user could enter the OTP into a part of a browser web form, or the user could verbally communicate the OTP to the merchant in person or over the phone. Any of these methods are acceptable, and many others are possible, so long as they effectively communicate the OTP from the user to the merchant. After receiving the account number and the OTP, the merchant may immediately transmit the data to another party to authorize the transaction 720, or the merchant may wait to transmit the data until later, possibly as part of a batch of transactions (not shown).

Figure 7C:
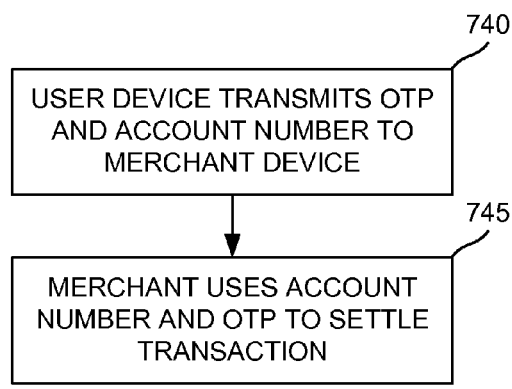

FIG. 7B illustrates one embodiment wherein the OTP may be transmitted directly from the user device to a device of the merchant 730. This could be done using NFC-enabled technology, Bluetooth, or any other available means of wireless transmission between proximate devices. In the case of internet-based transactions, the user device may include software routines running on special or general purpose hardware that receive or generate the OTP and automatically send the OTP to the merchant device, which in this case could be a web form or the underlying merchant server. FIG. 7C illustrates yet another embodiment wherein both the account number and the OTP may be transmitted from a device of the user to a device of a merchant 740. In this case, the user may only need to enter a user access code to authenticate the user's identity, and the user's device may proceed to carry out the rest of the transaction with varying levels of additional user input.

Figure 8:
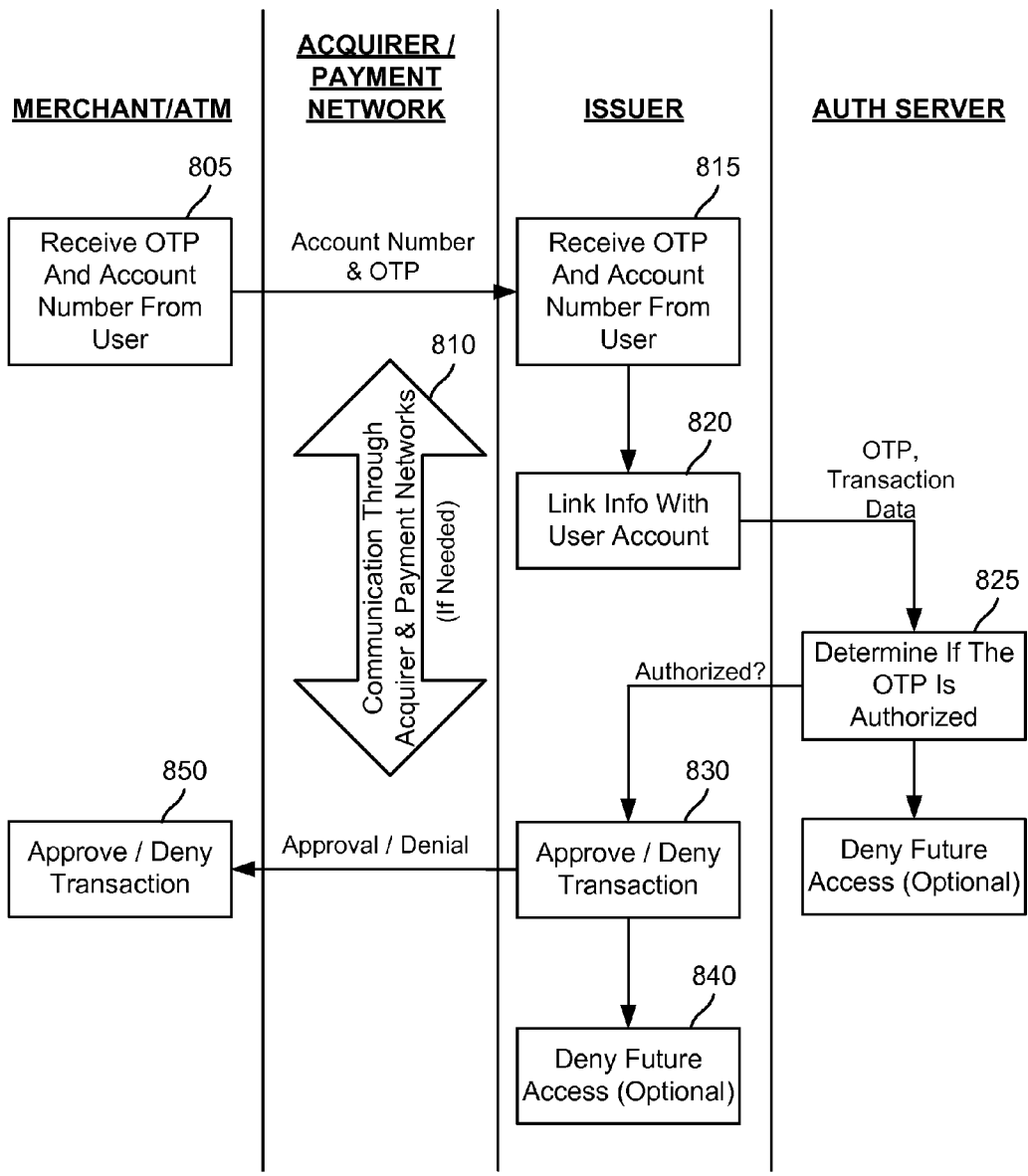
FIG. 8 illustrates a first method used in some embodiments to determine if an OTP is authorized for use.

Once the merchant has received the OTP and the account number from the user or user device, the merchant may send the OTP, account number, and transaction data, or some combination thereof, in a message through a communication network to determine whether the transaction should be approved. FIG. 8 illustrates an example process used by one embodiment. The merchant may send a request for approval to an issuer server 815. In common transactions, after leaving the merchant, the message will first pass through an acquirer and a card network 810. An acquirer may often handle many of the merchant's credit and debit card transactions. If user's issuer and the merchant's acquirer are associated with the same financial institution, then acquirer and the issuer may be the same entity, and there may be no reason to pass the message through a separate acquirer or credit card network. If the user's issuer and the merchant's acquirer are associated with separate institutions, then the acquirer may forward the message through a credit card network to the issuer for transaction approval. These variations on the common intermediaries in the communication network for settling and approving transactions are readily understood by one having skill in the art.

When the issuer receives the message originating from the merchant 815, the issuer may link the account number in the message with one or more accounts belonging to a customer of the issuer 820. If the password received in the message from the merchant is in the form of a CCV or PIN, the issuer may need to determine whether the password should be treated as an OTP. For example, the user may have enrolled in a special OTP program provided by the issuer, and the issuer may check the user account for an indication that the user's transactions may require an OTP. In one embodiment, the user may choose to enroll in an OTP program for certain types of transactions, such as internet transactions. In another embodiment, the user may enroll in an OTP program for transactions from a certain class of merchants, such as gas stations or high-end retailers. In other embodiments, the user may enroll in an OTP program for transactions over a predetermined purchase amount, or outside of a preferred location, or during a specific time window when fraudulent activity is more likely to occur. In these embodiments, the issuer may use the user account information, the transaction details, and any other information to determine whether the password in the message should be treated as an OTP.

After determining that the password is an OTP, the issuer may determine whether the OTP is authorized for use in this transaction. In one embodiment, the issuer sends a message to the authentication server to make this determination. The authentication sever receives the message from the issuer and associates the OTP in the transaction from an OTP that has been previously authorized or not for use 825. For example, if the OTP was previously authorized following authentication of an authorized user, the authentication server could substantially match the OTP sent from the issuer with the authorized OTP. In another example, the OTP may not have been previously authorized, and the authentication server could then initiate contact with the user in an attempt to authenticate the user and authorize the OTP. On the other hand, if the OTP was not authorized due to a failed authentication attempt, the authentication server could readily determine that the OTP was not authorized and send this determination to the issuer along with any other information that may be useful for the issuer to assess the security of the customer's account, such as the number of failed authentication attempts. In one embodiment, the authentication server may be able to approve a class of transactions for a class of OTP's that are authorized for use by one or more authenticated users associated with the same account.

Once the authentication server makes the determination as to whether the OTP is authorized for use in the transaction 825, this determination is sent back to the issuer. The issuer may then use the authentication server's determination to approve or deny the transaction 830. The issuer's decision may be made solely based on the response from the authentication server, or the issuer may also use additional information, such as account balance, number of fraud reports associated with the customer, or any other input that may indicate a likelihood that the user was authentic before allowing the transaction to go forward. In one embodiment where the transaction is not approved, the issuer may restrict future access to the account either generally or in other OTP-type transactions 840. In other embodiments, the issuer may take other actions in response to a transaction that is not approved due to failed authentication, such as informing law enforcement, sending a message to the account holder, or changing the credit limit of the account.

The final step in the process is informing the merchant whether the transaction has been approved or denied 850. If the transaction is approved then the merchant may complete the transaction. If the transaction is not approved, the merchant may inform the user that the transaction failed and may give the user another opportunity to settle the transaction using another payment method. In one embodiment, the user is given multiple opportunities to authenticate the user's identity with the authentication server and authorize the same or another OTP for use in the transaction. The transaction may simply restart from the beginning at this point, or the process can be streamlined to eliminate unnecessary steps for the second attempt, such as generating a new challenge or OTP.

Figure 9:
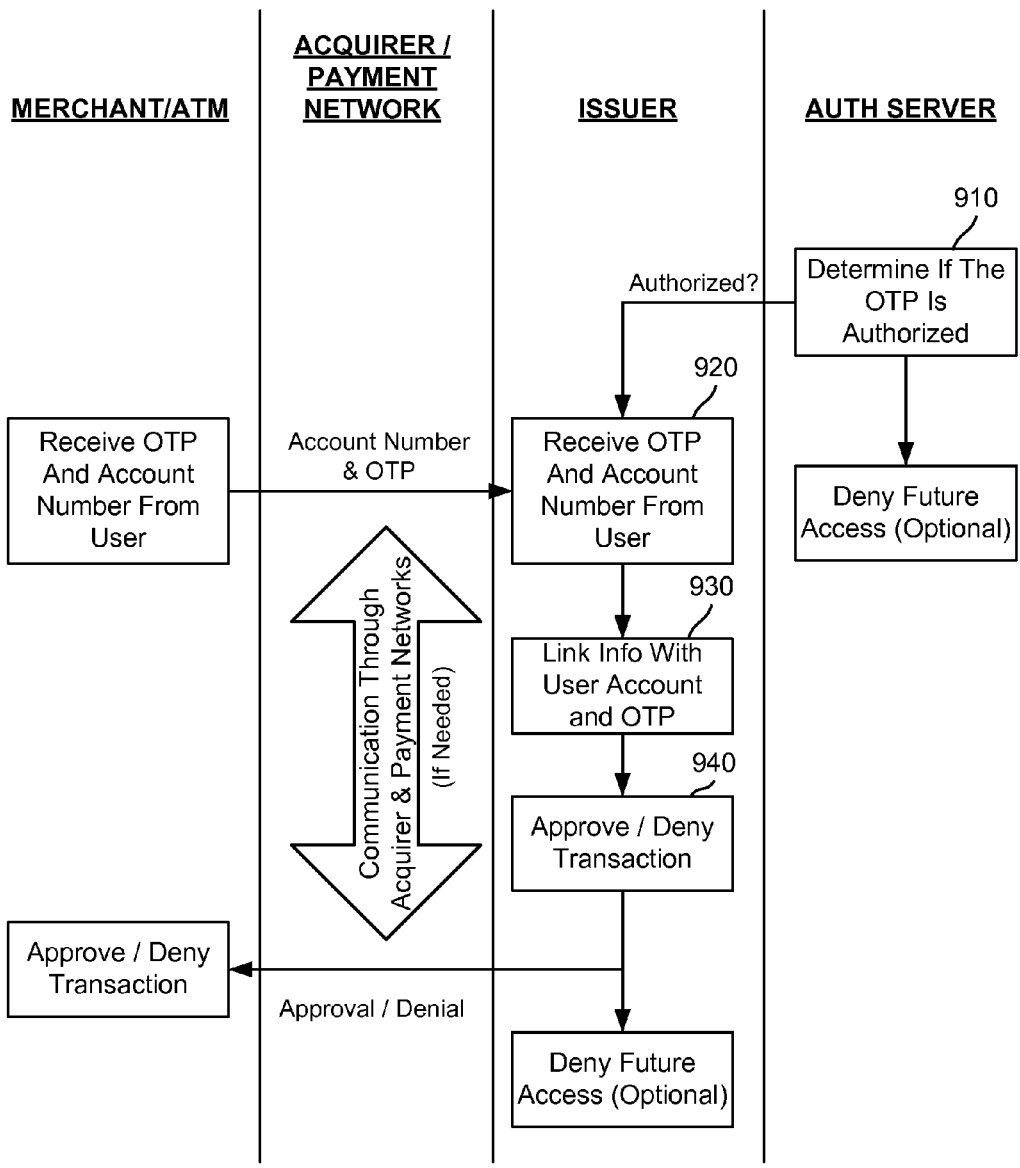
FIG. 9 illustrates a second method used in some embodiments to determine if an OTP is authorized for use.

FIG. 9 illustrates an embodiment similar to FIG. 8, except the authentication server sends the determination as to whether an OTP has been authorized for use by an authenticated user before any request is made to by the issuer. In this embodiment, the authentication server determines if the user is authentic and if the OTP should be authorized for the transaction 910. After authentication, the authentication server may send a message to the issuer indicating whether the particular OTP has been authorized 920. When the OTP is received by the issuer, the issuer may keep track of OTP's that have or have not been authorized before the issuer receives a request from a merchant to approve the use of an OTP.

Figure 10:
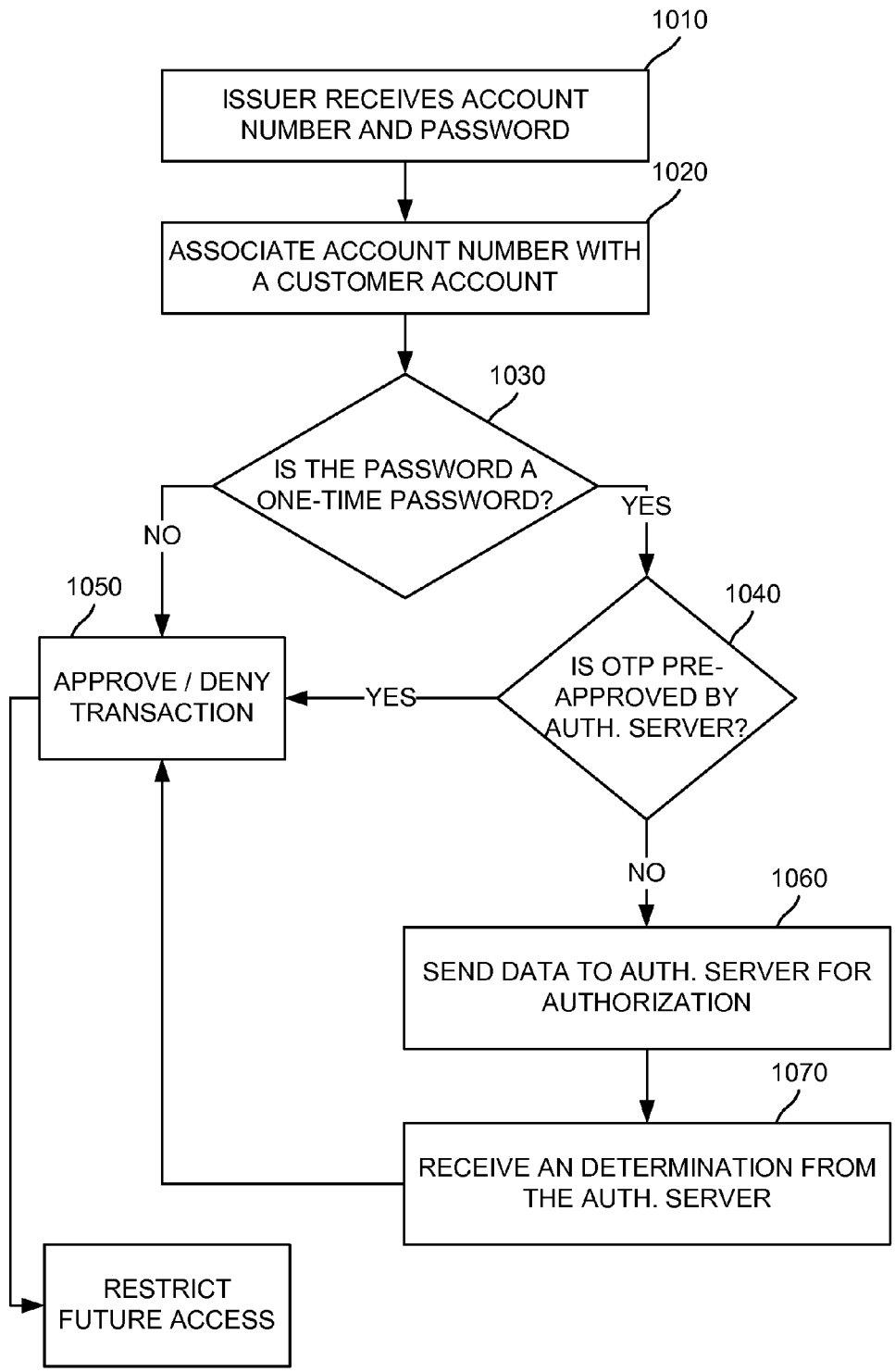
FIG. 10 illustrates an example of a method used by an embodiment of an issuer server.

FIG. 10 illustrates the process that the issuer may use to handle a request from a merchant using an embodiment similar to that of FIG. 9. When receiving a merchant request, the issuer may first link the account number to a customer account 1020, and determine if the password in the transaction is an OTP 1030. If the password is an OTP, the issuer may compare the OTP to an internal list of OTP's that have already been authorized by the authentication server 1040. If the OTP was previously approved, then the transaction can be approved 1050 without any additional third-part input. If the OTP has not been preapproved, the issuer can choose to approve or deny the transaction without further information, or the issuer can send a request to the authentication server to determine whether the OTP is authorized for use in the transaction by an authenticated user 1060. After receiving a determination from the authentication server 1070, the transaction may be approved or denied, and the decision can be sent to the merchant.

The issuer and acquirer in these embodiments will commonly use a computerized system to carry the described operations. These systems may be referred to as an issuer server or and acquirer server. These servers may be implemented using computer systems that are well known to one having ordinary skill in the art.

Figure 12:
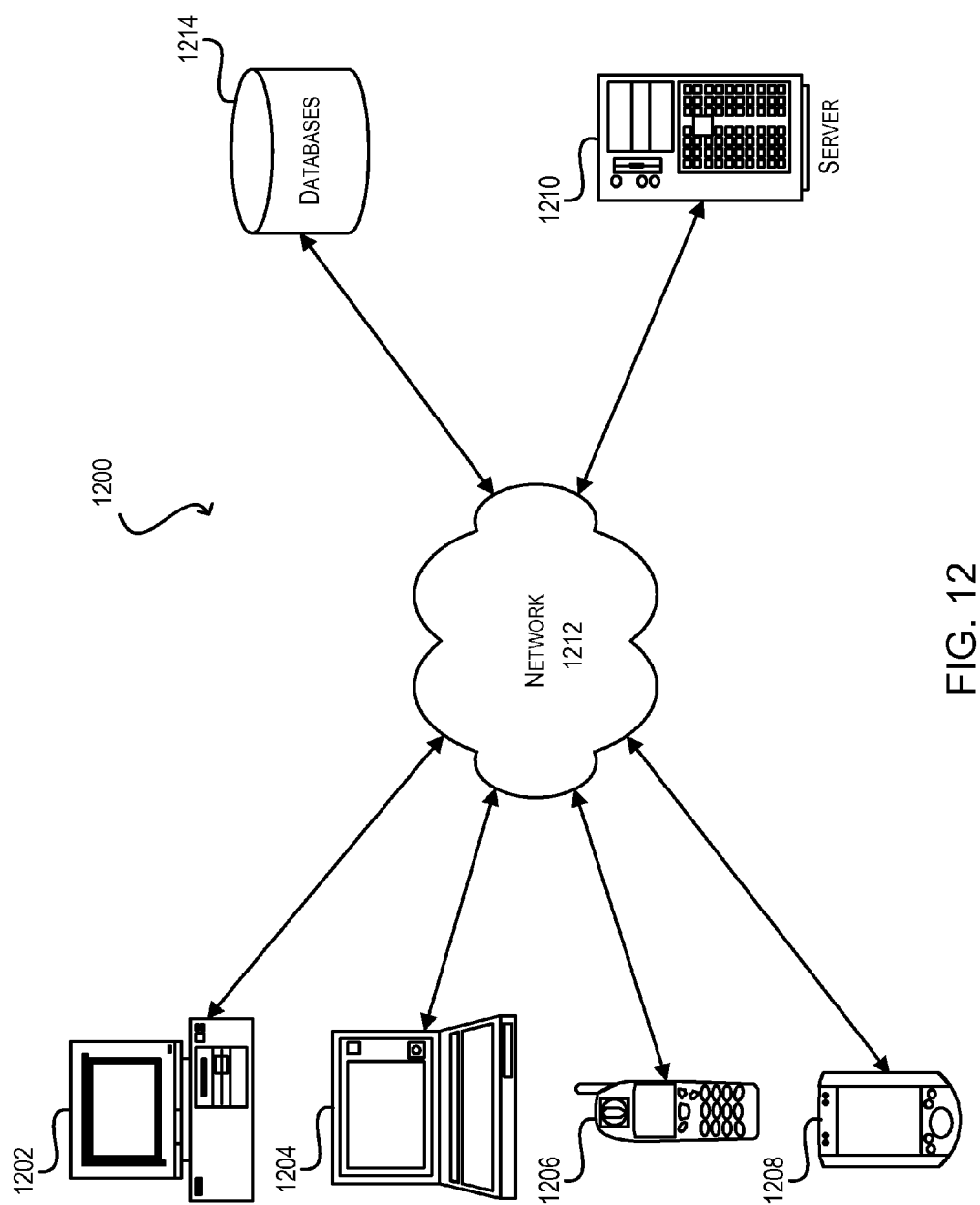
FIG. 12 is a simplified block diagram illustrating physical components of a system environment that may be used in some embodiments.

FIG. 12 is a simplified block diagram illustrating physical components of a system environment 1200 that may be used in accordance with an embodiment of the present invention. This diagram is merely an example, which should not unduly limit the scope of the claims. One of ordinary skill in the art would recognize many variations, alternatives, and modifications.

As shown, system environment 1200 includes one or more client computing devices 1202, 1204, 1206, 1208 communicatively coupled with a server computer 1210 via a network 1212. In one set of embodiments, client computing devices 1202, 1204, 1206, 1208 may be configured to run one or more components of a graphical user interface described above. For example, client computing devices allow user to create and customize network communities, enter search queries, view search results, and others.

Client computing devices 1202, 1204, 1206, 1208 may be general purpose personal computers (including, for example, personal computers and/or laptop computers running various versions of Microsoft Windows™ and/or Apple Macintosh™ operating systems), cell phones or PDAs (running software such as Microsoft Windows™ Mobile and being Internet, e-mail, SMS, Blackberry,™ and/or other communication protocol enabled), and/or workstation computers running any of a variety of commercially-available UNIX™ or UNIX™-like operating systems (including without limitation the variety of GNU/Linux™ operating systems). Alternatively, client computing devices 1202, 1204, 1206, and 1208 may be any other electronic device capable of communicating over a network (e.g., network 1212 described below) with server computer 1210. Although system environment 1200 is shown with four client computing devices and one server computer, any number of client computing devices and server computers may be supported.

Server computer 1210 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 1210 may run an operating system including any of those discussed above, as well as any commercially available server operating system. Server computer 1210 may also run any of a variety of server applications and/or mid-tier applications, including web servers, Java virtual machines, application servers, database servers, and the like. In various embodiments, server computer 1210 is adapted to run one or more Web services or software applications described in the foregoing disclosure. For example, server computer 1210 is specifically configured to implemented enterprise procurement systems described above.

As shown, client computing devices 1202, 1204, 1206, 1208 and server computer 1210 are communicatively coupled via network 1212. Network 1212 may be any type of network that can support data communications using any of a variety of commercially-available protocols, including without limitation TCP/IP, SNA, IPX, AppleTalk™, and the like. Merely by way of example, network 1212 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks. In various embodiments, the client computing devices 1202, 1204, 1206, 1208 and server computer 1210 are able to access the database 1214 through the network 1212. In certain embodiments, the client computing devices 1202, 1204, 1206, 1208 and server computer 1210 each has its own database.

System environment 1200 may also include one or more databases 1214. Database 1214 may correspond to an instance of integration repository as well as any other type of database or data storage component described in this disclosure. Database 1214 may reside in a variety of locations. By way of example, database 1214 may reside on a storage medium local to (and/or resident in) one or more of the computing devices 1202, 1204, 1206, 1208, or server computer 1210. Alternatively, database 1214 may be remote from any or all of the computing devices 1202, 1204, 1206, 1208, or server computer 1210 and/or in communication (e.g., via network 1212) with one or more of these. In one set of embodiments, database 1214 may reside in a storage-area network (SAN) familiar to those skilled in the art. Similarly, any necessary files for performing the functions attributed to the computing devices 1202, 1204, 1206, 1208, or server computer 1210 may be stored locally on the respective computer and/or remotely on database 1214, as appropriate. For example the database 1214 stores user profiles, procurement information, attributes associated with network entities.

Figure 11:
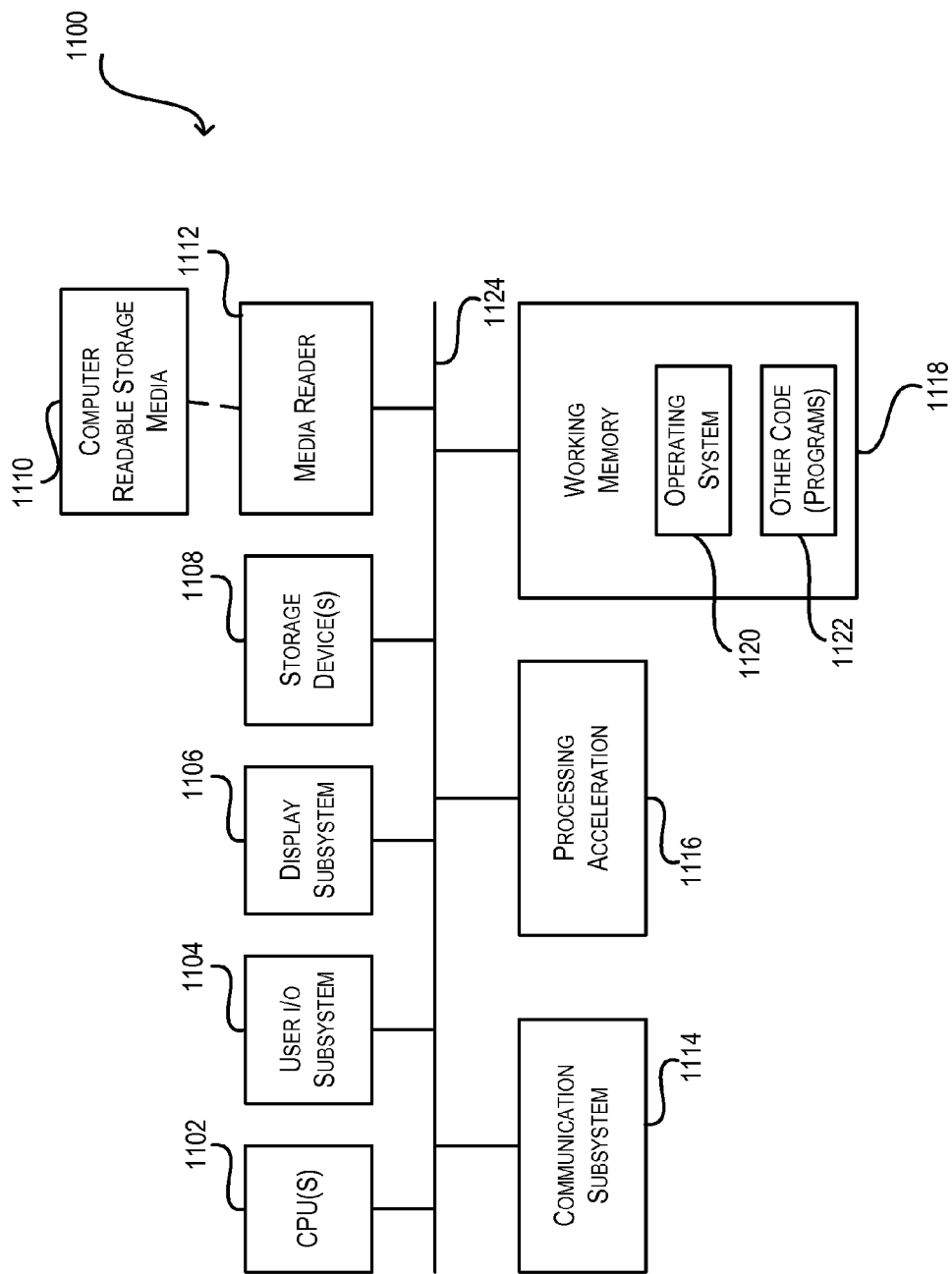
FIG. 11 is a simplified block diagram illustrating the physical components of a computer system that may be used in some embodiments.

FIG. 11 is a simplified block diagram illustrating the physical components of a computer system 1100 that may be used in accordance with an embodiment of the present invention. This diagram is merely an example, which should not unduly limit the scope of the claims. One of ordinary skill in the art would recognize many variations, alternatives, and modifications.

In various embodiments, computer system 1100 may be used to implement any of the computing devices 1202, 1204, 1206, 1208, or server computer 1210 illustrated in system environment 1200 described above. As shown in FIG. 11, computer system 1100 comprises hardware elements that may be electrically coupled via a bus 1124. The hardware elements may include one or more central processing units (CPUs) 1102, one or more input devices 1104 (e.g., a mouse, a keyboard, etc.), and one or more output devices 1106 (e.g., a display device, a printer, etc.). For example, the input devices 1104 are used to receive user inputs for procurement related search queries. Computer system 1100 may also include one or more storage devices 1108. By way of example, storage devices 1108 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 1108. For example, the central processing units 1102 is configured to retrieve data from a database and process the data for displaying on a GUI.

Computer system 1100 may additionally include a computer-readable storage media reader 1112, a communications subsystem 1114 (e.g., a modem, a network card (wireless or wired), an infra-red communication device, etc.), and working memory 1118, which may include RAM and ROM devices as described above. In some embodiments, computer system 1100 may also include a processing acceleration unit 1116, which can include a digital signal processor (DSP), a special-purpose processor, and/or the like.

Computer-readable storage media reader 1112 can further be connected to a computer-readable storage medium 1110, together (and, optionally, in combination with storage devices 1108) comprehensively representing remote, local, fixed, and/or removable storage devices plus storage media for temporarily and/or more permanently containing computer-readable information. Communications system 1114 may permit data to be exchanged with network 1212 of FIG. 12 and/or any other computer described above with respect to system environment 1200.

Computer system 1100 may also comprise software elements, shown as being currently located within working memory 1118, including an operating system 1120 and/or other code 1122, such as an application program (which may be a client application, Web browser, mid-tier application, RDBMS, etc.). In a particular embodiment, working memory 1118 may include executable code and associated data structures for one or more of design-time or runtime components/services. It should be appreciated that alternative embodiments of computer system 1100 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 1100.

In one set of embodiments, the techniques described herein may be implemented as program code executable by a computer system (such as a computer system 1100) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The invention has now been described in detail for the purposes of clarity and understanding. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of using a one-time password for a transaction between a user and a merchant, comprising:
   generating the one-time password by an electronic device;
   performing an authentication process of the user by an authentication server in response to a request from the user to use the one-time password, the user is authenticated based on information other than the one-time password;
   authorizing the use of the one-time password for the transaction in response to successfully authenticating the user by the authentication server;
   determining that the use of the one-time password is not authorized for the transaction in response to authentication of the user by the authentication server failing;

receiving the one-time password in combination with an account number at an electronic device of the merchant;

sending a first electronic message to the authentication server, wherein the first electronic message comprises the one-time password, and wherein the first electronic message requests a determination whether the one-time password is authorized for use in the transaction based on successful verification of the user;

sending a second electronic message to the electronic device of the merchant, wherein the second electronic message includes a determination whether the transaction should be approved, the determination is based in part on whether the authentication server indicates the one-time password is authorized for use in the transaction based on successful verification of the user.

2. The method of claim 1, wherein the account number comprises a debit card number, and the one-time password comprises a PIN associated with the debit card number.

3. The method of claim 1, wherein the account number comprises a credit card number, and the one-time password comprises a card security code associated with the credit card number.

4. The method of claim 1, wherein generating the one-time password comprises a function of one or more transaction data.

5. The method of claim 1, wherein generating the one-time password comprises a device of the user generating the one-time password.

6. The method of claim 1, wherein generating the one-time password comprises an issuer server generating the one-time password.

7. The method of claim 1, wherein generating the one-time password comprises the authentication server generating the one-time password.

8. The method of claim 1, wherein authenticating the user by the authentication server in response to a request from the user comprises:

signing a challenge by a device of the user to create a signed challenge;

sending an authentication message originating from the device of the user to the authentication server via a secure communication channel, wherein the authentication message includes the signed challenge; and using the signed challenge by the authentication server to authenticate the user.

9. The method of claim 8, wherein signing a challenge by a device of the user to create a signed challenge comprises:

receiving a user access code by the device of the user;

using at least the user access code to retrieve a private key from a key wallet, wherein the key wallet is configured to output a key having the appearance of the private key for at least one access code not equaling the user access code; and creating the signed challenge by encrypting the challenge with the private key.

10. The method of claim 8, wherein the authentication message further comprises: a public key associated with the user, wherein the public key is encrypted using a key known only to the authentication server.

11. The method of claim 8, wherein using the signed challenge by the authentication server to authenticate the user comprises:

decrypting a public key associated with the user using a key known only to the authentication server;

decrypting the signed challenge using the public key to create a decrypted challenge;

comparing the decrypted challenge to the challenge; and authenticating the user in response to a determination that the decrypted challenge equals the challenge.

12. The method of claim 1, wherein using the one-time password in combination with an account number as a part of the transaction comprises a device of the user wirelessly transmitting the one-time password to a device of the merchant.

13. The method of claim 1, wherein using the one-time password in combination with an account number to settle the transaction comprises: the device of the user transmitting the account number to a device of the merchant.

14. A system for using a one-time password in a transaction, comprising:

a device of a merchant configured to receive the one-time password and an account number from a device of a user;

an authentication server configured to receive a request originating from the device of the user to authorize the one-time password for use in the transaction in response to authenticating the user based on information other than the one-time password;

an issuer server configured to communicate with the authentication server to determine whether the one-time password is authorized for use in the transaction based on the user being authenticated on the information other than the one-time password, and to communicate with the device of the merchant to determine whether the transaction has been approved or denied based, at least in part, on whether the one-time password is authorized for use in the transaction.

15. The system of claim 14, further comprising:

an acquirer server configured to communicate with the device of the merchant to authorize the transaction using the one-time password;

a payment network configured to communicate with the acquirer server to authorize the transaction using the one-time password, and configured to communicate with the issuer server to authorize the transaction using the one-time password; and wherein the acquirer server is configured to communicate with the payment network to authorize the transaction using the one-time password.

16. The system of claim 14, wherein the device of the user comprises a key wallet configured to:

securely store at least a private key in encrypted form;

accept a user access code;

decrypt and output at least the private key in response to a correct user access code; and output a key having the appearance of the private key for at least one user access code not equaling the correct user access code.

17. The system of claim 14, wherein the authentication server is further configured to:

receive a public key that has been encrypted using a key known only to the authentication server;

receive an signed challenge that has been signed using a private key that is paired with the public key;

decrypt the public key using the key known only to the authentication server;

decrypt the signed challenge using the public key to create a decrypted challenge; and determine if the decrypted challenge matches a previously defined challenge.

18. The system of claim 14, wherein the device of the merchant is configured to receive the one-time password from the user by a user receiving the one-time password from the device of the user and manually entering the one-time password into the device of the merchant.

19. The system of claim 14, wherein the device of the merchant is configured to receive the one-time password from the device of the user by the device of the user transmitting the one-time password to the device of the merchant.

20. The system of claim 14, wherein the device of the merchant is configured to receive the account number from the device of the user by the device of the user transmitting the account number to the device of the merchant.

21. The system of claim 16, wherein the device of the user is further configured to:
 sign a challenge using the private key to create a signed challenge; and
 send to the authentication server the signed challenge and a public key that is paired with the private key, wherein the public key is encrypted using a key known only to the authentication server.

22. A method of using a one-time password for a transaction between a user and a merchant, comprising:
 performing an authentication process of the user by an authentication server, the authentication process comprising receiving information from the user other than a one-time password and authenticating the user based on the information other than the one-time password;
 storing an indication by the authentication server whether the one-time password is valid or invalid for use in the transaction between the user and the merchant depending upon whether the user is successfully authenticated;
 receiving the one-time password in combination with an account number at an electronic device of the merchant;
 sending a request from an electronic device of the merchant to an electronic device of an issuer to determine whether the transaction should be authorized or denied in response to receiving the one-time password in combination with an account number at an electronic device of the merchant;
 sending a first electronic message the authentication server from an electronic device of the issuer, wherein the first electronic message comprises the particular one-time password, and wherein the first electronic message requests a determination whether the particular one-time password is authorized for use in the transaction based on successful authentication of the user;
 receiving a response at an electronic device of the issuer from the authentication server of whether the one-time password is valid or invalid for use in the transaction between the user and the merchant depending upon whether the user is successfully authenticated;
 determining by an electronic device of the issuer whether the transaction should be approved or denied based in part on whether the authentication server indicates the particular one-time password is authorized for use in the transaction based on successful verification of the user; and
 sending a second electronic message from an electronic device of the issuer to the electronic device of the merchant, wherein the second electronic message includes a determination whether the transaction should be approved or denied.

* * * * *